No. 739,988. PATENTED SEPT. 29, 1903.
A. A. COBURN & F. HARNDEN.
BAND CUTTER AND SELF FEEDER FOR CORN HUSKING AND SHREDDING MACHINES.
APPLICATION FILED OCT. 3, 1902.
NO MODEL.
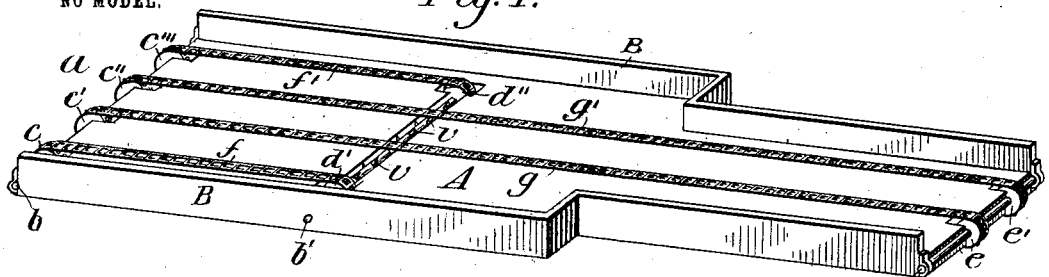
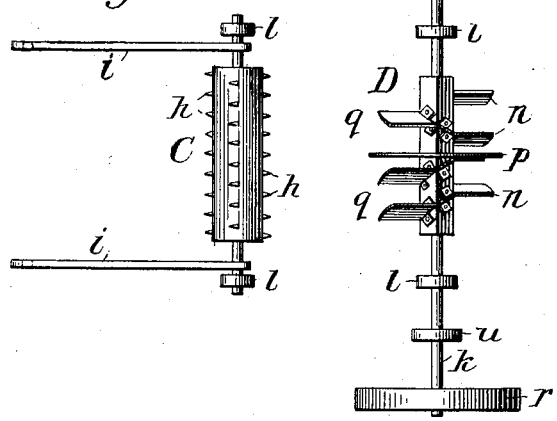
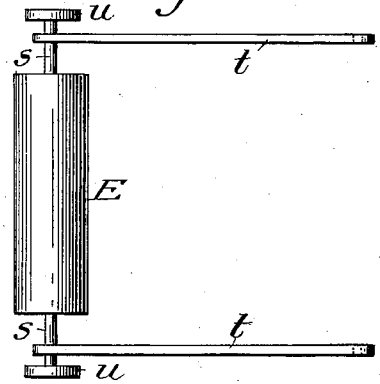
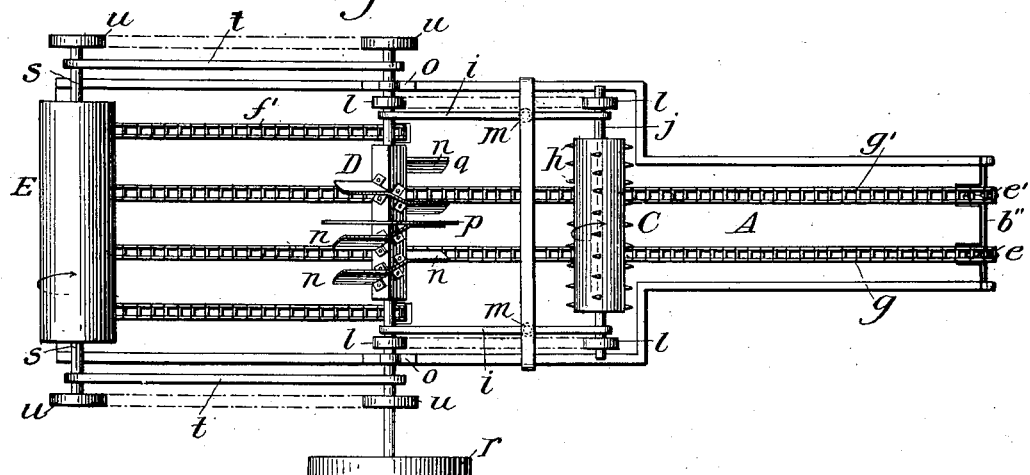
Witnesses:
Jennie A. Coleman.
Della A. Harne
Inventors
Addison A. Coburn
Frank Harnden,
Per Edwin T. Cass, attorney.

No. 739,988. Patented September 29, 1903.

UNITED STATES PATENT OFFICE.

ADDISON A. COBURN, OF COLDSPRING, AND FRANK HARNDEN, OF PALMYRA, WISCONSIN.

BAND-CUTTER AND SELF-FEEDER FOR CORN HUSKING AND SHREDDING MACHINES.

SPECIFICATION forming part of Letters Patent No. 739,988, dated September 29, 1903.

Application filed October 3, 1902. Serial No. 125,841. (No model.)

*To all whom it may concern:*

Be it known that we, ADDISON A. COBURN, residing at Coldspring, and FRANK HARNDEN, residing at Palmyra, in the county of Jefferson and State of Wisconsin, citizens of the United States, have invented a new and useful Band-Cutter and Self-Feeder for Corn Husking and Shredding Machines, of which the following is a specification.

Our invention relates to band-cutters and self-feeders for corn husking or shredding machines in which bundles of corn are thrown into a conveyer, where the bands are cut and the stalks of corn are spread out evenly while being carried to and fed into the husking or shredding machine; and the objects of our invention are, first, to provide a conveyer in which the chains doing the greater part of the work can be adjusted without interfering with the other chains; second, to furnish a band-cutter which will adjust itself automatically to different-sized bundles, and, third, to supply a feed-roller and spreader which will work uniformly upon a variable quantity of corn passing through the machine. We obtain these objects by the mechanism illustrated in the accompanying drawings, in which—

Figure 1 is a view of the conveyer with the band-cutter, spreader, and feed-roller removed, so as to show the arrangement of the carrying-chains. Fig. 2 is a view of the band-cutter, Fig. 3 of the spreader, Fig. 4 of the feed-roller, and Fig. 5 of the complete machine with all its parts in place excepting B B.

Similar letters refer to similar parts throughout the several views.

The table A with its upward-projecting wings B B constitute the frame of the machine, and is attached to the husking or shredding machine at its end $a$ in any suitable manner so that it will communicate with the feed-opening of the husker or shredder. The shafts $b$, $b'$, and $b''$ extend across the table A and rest in bearings at each end secured to the frame, in which they are revolved by power communicated by any suitable gear. The shaft $b$ has four sprockets or pulleys $c$, $c'$, $c''$, and $c'''$; $b'$ has two, $d\ d''$, and $b''$ has two, $e\ e'$, for the conveyers $f f'$ and $g g'$, which are endless chains passing over and under the table A, moved forward toward the end $a$ by the revolution of the shafts $b\ b'\ b''$.

The band-cutter C is a cylinder having knives $h$ arranged radially upon the circumference and arms $i\ i$ at each end hinged to its shaft $j$. The other ends of the arms $i\ i$ are hinged to the shaft $k$ of the spreader D, so that C rides upon the bundles passing under it and adjusts itself to the size of each bundle. C is driven from the shaft $k$ by belts working on the pulleys $l\ l\ l\ l$, and its weight is partially sustained by the springs $m\ m$, which prevents its pressing too hard upon the bundles. Knives $v\ v$, &c., are also placed on shaft $b'$ as auxiliary cutters.

The spreader D consists of the shaft $k$, having vanes $n\ n\ n\ n\ n$, &c., arranged radially upon it and rests in bearings $o\ o$, secured to the frame A. Each of the vanes $n\ n$, &c., consists of two parts, one of which, $p$, divides the stalks and the other of which, $q$, spreads them. The dividers $p$ are flat sections of a disk and stand in planes perpendicular to $k$, and all those on one side of the center of $k$ are bent slightly to the left and all those on the other side are bent slightly to the right, forming the spreading-vanes $q\ q\ q$, &c. Power is applied to $k$ by a pulley $r$, driving D in the direction indicated by the arrows in the drawings.

The feed-roll E is a cylinder upon a shaft $s$, having arms $t\ t$ hinged at each end. The opposite ends of $t\ t$ are hinged to the shaft $k$, so that the roller E works up and down and adjusts itself to the quantity of stalks passing under it. E is driven by belts upon pulleys $u\ u\ u\ u$ and revolves in the direction indicated by the arrows.

Having thus described our invention, what we claim as new, and desire to secure by Letters Patent, is—

1. A stalk-spreader comprising a shaft, a central divider-disk thereon in a plane perpendicular to said shaft, short inclined spreader-sectors extending from both sides of the disk, to divider-sectors parallel to the plane of said disk, and other inclined spreader-sectors extending from these sectors to other sectors parallel to the central disk whereby a pair of oppositely-pitched interrupted spirals are formed.

2. In a band-cutter and feeder for corn-husking machines the combination of a table carrying feed-chains, a shaft thereover carrying a spiral stalk-spreader, a pair of arms pivoted on said shaft and extending forward therefrom, carrying at their free ends a cylinder provided with band-cutting knives, a second pair of arms pivoted on and extending rearward from said shaft, carrying at their free ends a feed-roller, with means for driving the upper run of the feed-chains and the lower sides of the band-cutter, spreader and feed-roll in the same direction.

In testimony whereof we have signed our names to this specification in the presence of two subscribing witnesses.

ADDISON A. COBURN.
    FRANK HARNDEN.

Witnesses:
 MARTIN MASON,
 N. O. NELSON.